April 10, 1956     L. E. BAYNES     2,741,444
HIGH SPEED AIRCRAFT HAVING WINGS WITH VARIABLE SWEEPBACK
Filed Feb. 12, 1952     4 Sheets-Sheet 1
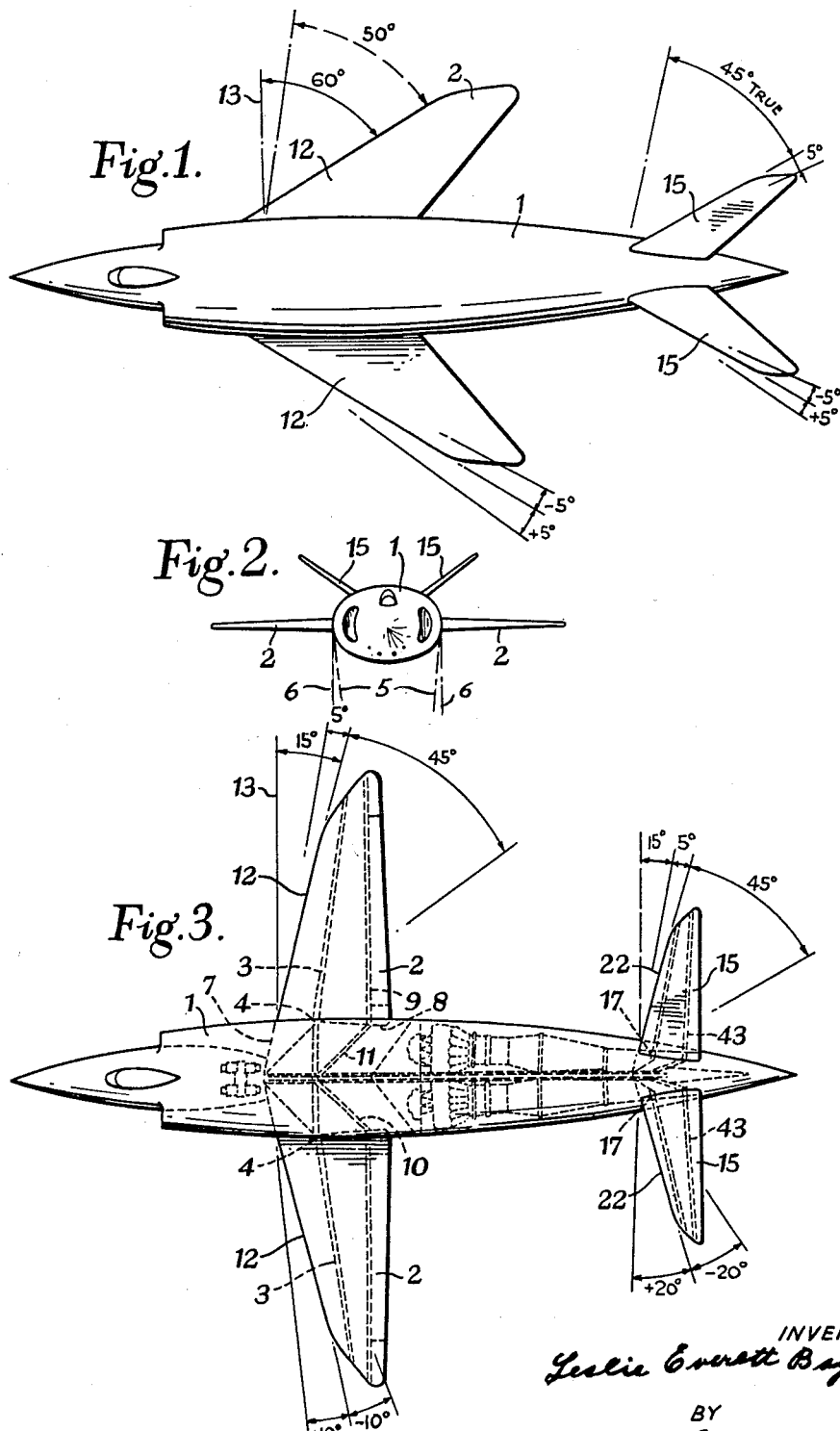

April 10, 1956  L. E. BAYNES  2,741,444
HIGH SPEED AIRCRAFT HAVING WINGS WITH VARIABLE SWEEPBACK
Filed Feb. 12, 1952  4 Sheets-Sheet 2

INVENTOR
Leslie Everett Baynes
BY
Dean Fairbank & Hirsch
HIS ATTORNEYS

April 10, 1956     L. E. BAYNES     2,741,444
HIGH SPEED AIRCRAFT HAVING WINGS WITH VARIABLE SWEEPBACK
Filed Feb. 12, 1952     4 Sheets-Sheet 4

INVENTOR
Leslie Everett Baynes
BY
Dean Fairbank & Hirsch
his ATTORNEYS

United States Patent Office 2,741,444
Patented Apr. 10, 1956

2,741,444

HIGH SPEED AIRCRAFT HAVING WINGS WITH VARIABLE SWEEPBACK

Leslie Everett Baynes, Holyport, near Maidenhead, England, assignor to Baynes Aircraft Interiors Limited, Langley Aerodrome, Buckinghamshire, England Application February 12, 1952, Serial No. 271,136

Claims priority, application Great Britain February 12, 1951

5 Claims. (Cl. 244—46)

The present invention relates to high speed aircraft and constitutes an improvement in or modification of the invention claimed in U. S. patent application No. 148,179.

In the specification of this earlier application there is described an aircraft suitable for operation at high speed having a fuselage, wings, and a tail surface, the wings being hinged at their attachment to the fuselage in such a manner that for low speed flight the wings can be extended approximately normally to the direction of motion in the conventional manner, and be of relatively high aspect ratio, and for high speed flight the wings can be folded back about the hinges to an extent that will give the pronounced sweep back and relatively low aspect ratio which is desirable under these conditions, and the tail lift is made variable in such a manner that the longitudinal trim is maintained within safe limits. The hinge axes of the wings are preferably inclined to the normal to the direction of motion in such a manner as to provide a suitable variation in the angle of incidence with variation in sweepback.

Control means may be arranged to vary the sweepback of the wings and the tail lift simultaneously to appropriate extents. Conventional hinged control surfaces, which tend to be ineffective at supersonic speeds, are dispensed with for both longitudinal and lateral control.

In the case of directional control, however, it is not possible to employ variable sweep of a vertical surface to provide the control normally given by a conventional hinged rudder and fin combination. It was, therefore, proposed in the earlier specification referred to above that a rudder hinged to either a fixed or a variable sweep fin should be provided for directional control only at slow speeds, as required for take-off and landing.

When employing the variable sweep tail as described in the earlier specification referred to, the disposition of the tail is limited, vertically, to a position approximately in the plane of the wings in order to accommodate the tail roots within the fuselage when the tail is swept back, but it may be undesirable to locate the tail in the unstable wake of the wings at transonic and supersonic speeds.

The object of the present invention is to overcome the above-mentioned limitations and at the same time provide a tail construction which is simpler than that set forth in the earlier specification.

According to the present invention, an aircraft has a fuselage, two wings hinged to the fuselage about axes which are approximately vertical when the aircraft is in level flight, two tail surfaces set at a substantial dihedral angle and hinged to the fuselage about axes approximately normal to the tail surfaces, and control means operable while the aircraft is in flight for varying the sweepback of the wings and tail, the sweepback of the tail surfaces being variable in unison for longitudinal control and differentially for control in yaw.

The hinge axes of the tail surfaces are preferably inclined to the normal to the tail surfaces in such a manner as to give a suitable variation of incidence with variation of sweepback.

The control in yaw provided by the present invention is effective at supersonic as well as low speeds, which is not the case with a hinged rudder, and at the same time the large dihedral angle raises the position of the tail surfaces well above the turbulent wake in the plane of the wings while still permitting the roots of the tail surfaces to pass into the fuselage when swept back. It is also possible to reduce weight and generally to simplify the tail design by the use of the present invention.

The invention is illustrated by way of example in the accompanying drawings in which:

Fig. 1 is a view in plan and Fig. 2 a view in front elevation of the improved aircraft in condition for high-speed flight.

Fig. 3 is a view in plan and Fig. 4 a view in front elevation of the aircraft in condition for taking-off and landing and Fig. 5 is a view in side elevation of the aircraft.

Figure 4:
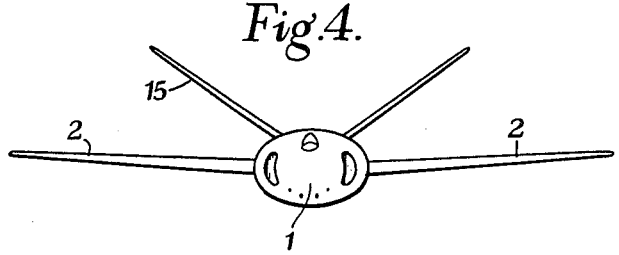

Referring to the drawings Figs. 1 to 4. The fuselage represented at 1, is of elliptical cross section having its major axis horizontal, and the wings 2 are provided, through a main span 3, with hinge connections 4 adjacent to and inside the skin of the fuselage 1, the axes 5 of these hinges being slightly inclined to perpendiculars 6 to the plane containing the longitudinal axis of the fuselage 1 and the major axes of the elliptical sections, in such manner that the two hinge axes 5, when extended in an upward direction are inclined, both laterally and rearwardly with respect to the respective perpendiculars 6, all as fully described in the specification of U. S. patent application Number 148,179.

The wings 2 have a shape and dihedral angle similar to that described in the specification of U. S. patent application No. 148,179.

The leading and trailing portions 7 and 8 (Figure 3) of the wing roots extend into the fuselage 1 through longitudinal slots in the skin in order to prevent the occurrence of any gap between wing and fuselage when the wings are in either their spread or their swept-back position.

Each wing has an auxiliary spar 9 behind the main spar 3, and the auxiliary spar may be guided in the fuselage in such a way as to take vertical forces due to torsional loads on the wing. Alternatively these loads may be taken solely by the hinges 4 of the main spar. The inner ends of the auxiliary spars 9 of the two wings are pivotally connected to two operating struts 10 and 11 leading inwards and forwards to two irreversible screw-jack mechanisms disposed side by side longitudinally of the aircraft.

At low speed the leading edge 12 of each wing 2 is in its normal fully spread position as shown in Fig. 3 with the leading edge 12 inclined backward with respect to the normal 13 to the direction of movement by 15° and the angle of incidence is 6°. For longitudinal control a movement of the wings 2 in unison through 5° forward and 45° backward, as indicated at the upper side of Fig. 3, is provided for. For lateral control a differential movement of the wings 2 through ±10°, as indicated from the underside of Fig. 3, from the normal fully spread position is provided for.

Figure 5:
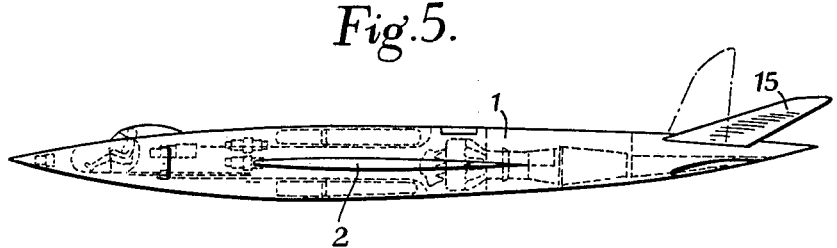

At high speed the leading edges 12 of the wings 2 are swept back by 60° from the normal 13 to the direction of movement, as shown in Fig. 1 and the angle of incidence, namely, the angle between the plane of the wing chord and the line of thrust, which may be taken as the axis of the fuselage in Figure 5, is 1¼°. For longitudinal control the wings 2 are adjustable in unison forward of this fully swept back position to the normal fully spread position. For lateral control at high speed a differential movement of the wings 2 through ±5° as indicated at the underside of Fig. 1 is provided for.

Figure 7:
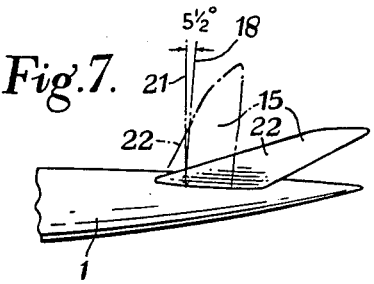
Figure 8:
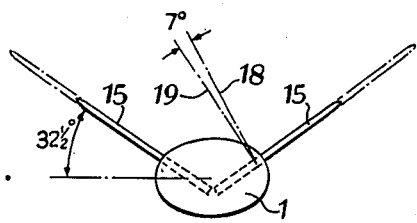
Fig. 8 is a view in end elevation looking from the left hand side of Fig. 7.

The tail surfaces 15 have a dihedral angle of 32½° as shown in Fig. 8 and they are hinged to the fuselage by hinges 17 within the skin of the latter and the hinge axes 18 of the tail surfaces 15 are inclined away from the normals 19 to the tail surfaces by 7° outwards and upwards as shown in Fig. 8 and these axes 18 also are inclined rearwards and upwards by 5½° to the vertical 21 in the manner shown in Fig. 7 when the aircraft is in level flight. The tail surfaces 15 have the same geometrical shape as the wings 2.

Figure 6:
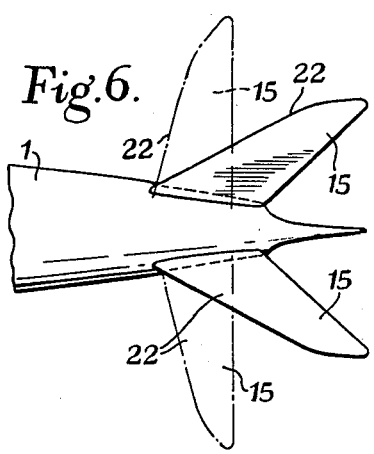
Figs. 6 and 7 are further views in diagrammatic plan and side elevation respectively showing the tail unit according to the invention.

In the normal fully spread condition for low speed, as shown at the upper side of Fig. 3 and in dotted lines in Figs. 6, 7 and 8, the leading edge 22 of each tail surface 15 is swept back by 15° to the normal 23 to the direction of flight (Fig. 3) in the plane of the surface and the angle of incidence is 3°. In the fully swept back position for high speed as shown in Fig. 1 and in full lines in Figs. 6, 7 and 8, the sweepback from the normal fully spread position is 45° as shown at the upper side of Fig. 1 and the angle of incidence is zero.

For longitudinal control at low speed the tail surfaces 15 are movable about the hinges 17 in unison with one another and with the wings 2, forward by 5° also as shown in Fig. 3, where the angle of incidence is 3⅓°, and backward by any amount up to the fully swept back position. For longitudinal control at high speed the tail surfaces 15 are normally movable in unison forward by 5° as shown at the upper side in Fig. 1 from the fully swept back position, although the full range of movement to the fully spread position is available for change to low speed flight.

For directional control at low speed, the tail surfaces 15 are movable differentially forward by 20° as indicated at the lower side of Fig. 3, where the angle of incidence is 4⅓° and backward by 20° also as indicated at the lower side of Fig. 3, where the angle of incidence is 1⅔°. At high speed a movement of ±5° is provided for as indicated at the lower side of Fig. 1.

All the angles of sweepback are measured in the planes of the respective tail surfaces 15.

Other leading particulars of the embodiment described and illustrated are:

|  | Spread | Swept |
|---|---|---|
| Span | 46 ft. 6 in | 29 ft. |
| Net wing area | 238 sq. ft | 190 sq. ft. |
| Gross wing area | 317 sq. ft | 317 sq. ft. |
| Thickness/chord ratio of wing section | 9.6% | 6%. |
| Mean chord | 6.82 ft | 10.95 ft. |
| Wing dihedral | 3° | 0°. |
| Aspect ratio | 6.85/1 | 2.65/1. |
| Net tail area | 72 sq. ft | 61.5 sq. ft. |
| Gross tail area | 100 sq. ft | 100 sq. ft. |
| Tail volume ratio | 1.26/1 | 0.7/1. |
| Length of fuselage | 63 ft. | |
| Weight empty | 14,600 lb. | |
| Gross weight | 25,000 lb. | |
| Stalling speed (at 20,000 lb. weight) | 95 knots. | |

It will be understood that the various angles referred to above and indicated in the drawings are given by way of example only and that they may be varied within limits without departing from the invention.

Furthermore, in the example described and illustrated, there is no change in the dihedral angle of the tail surfaces as between the normal spread and swept back positions but variation of the dihedral angle and also of incidence may in some cases be provided for by change of the inclination of the hinge axes of the tail surfaces from that described and shown.

Figure 9:
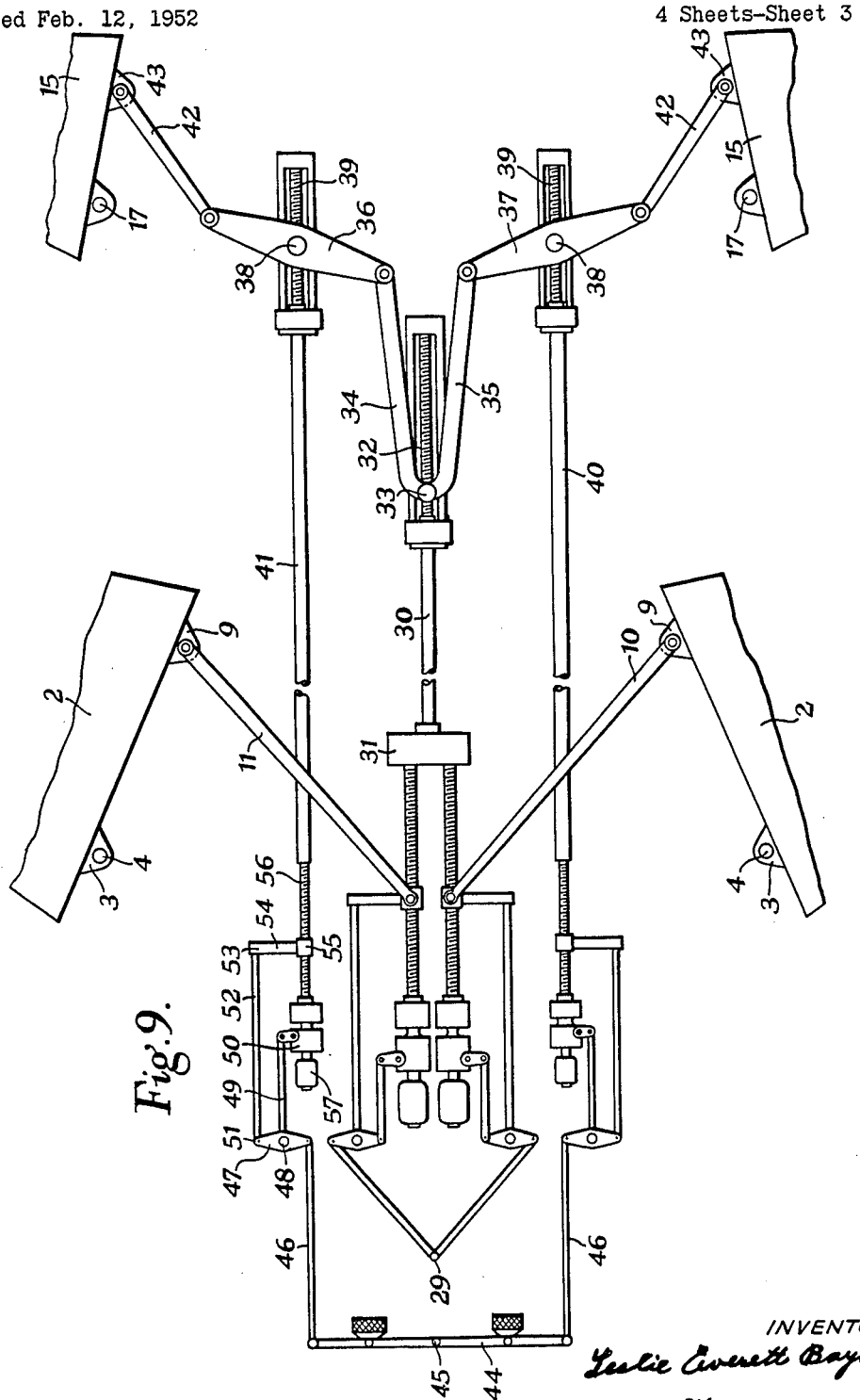
Figs. 9 and 10 are diagrammatic views showing two forms of control mechanism for the wings and tail surfaces.

One form of control mechanism suitable for varying the sweepback of the wings 2 and the tail surfaces 15 is illustrated diagrammatically in Fig. 9.

The control mechanism shown includes means for varying the sweepback of the wings 2 by means of a control column 29 and a shaft 30 leading aft from a differential gear 31 to the tail of the machine, the shaft 30 being rotated in one direction or the other in accordance with movements of the operating push rods or links 10 and 11 moving the wings 2 in a fore and aft direction and produced in response to movements of the control column 29 in a fore and aft direction, and all as fully described in U. S. patent specification No. 148,179.

In the arrangement according to the present invention as shown in Fig. 9, the shaft 30 is threaded at the tail end of the fuselage as indicated at 32 and carries a nut 33 to which are pivotally attached the inner ends of two links 34 and 35, the outer end of each of these links being pivoted to one end of one of a pair of centrally pivoted levers 36, 37. The central pivots 38 of the levers 36, 37 are mounted upon nuts running upon threaded portions 39 of port and starboard control shafts 40 and 41 to be described later. The other end of each lever 36 and 37 is pivoted to one end of an operating push rod or link 42, the other end of which is pivoted to the end of an auxiliary spar 43 of one of the two tail surfaces 15. The hinging of the tail surfaces 15 at the points 17 to the fuselage 1 and the coupling of the push rods or links 42 to the surfaces 15 may be as described in the earlier specification for the horizontal tail elements thereof, except that the angle of the hinge axes 18 (Figs. 7 and 8) is different as will be described later.

The port and starboard control shafts 40 and 41 may be operated from a rudder bar 44 as follows. The rudder bar 44 is pivoted at its centre 45 and has a link 46 provided at each end. One jack unit serving as a coupling between only one of these links 46 and one of the control shafts 40 or 41 (port or starboard) will now be described, the two units being identical. The link 46 is pivoted to one end of a centrally pivoted lever 47, the pivot 48 of this lever being connected by a control rod 49 passing through a suitable guide to the control valve of a hydraulic variable speed gear 50. The other end 51 of the lever 47 is pivoted to one end of a link 52 having its other end 53 connected to a bracket 54 fixed to a nut 55 working upon a threaded portion 56 at the forward end of the port or starboard control shaft 40 or 41, as the case may be. The link 52, the bracket 54, the nut 55 and the threaded shaft 40 or 41 constitute the tail control follow-up gear. An electric motor 57 drives the shaft 40 or 41 through the hydraulic variable speed gear 50.

It will be evident that the movement applied to produce hinging of the tail surfaces 15 is compounded of that produced by the shaft 30 from the wing control mechanism through the differential gear 31 and that produced by movement of the rudder bar 44, the latter being differential as between the two tail surfaces 15 and producing control in yaw.

Figure 10:
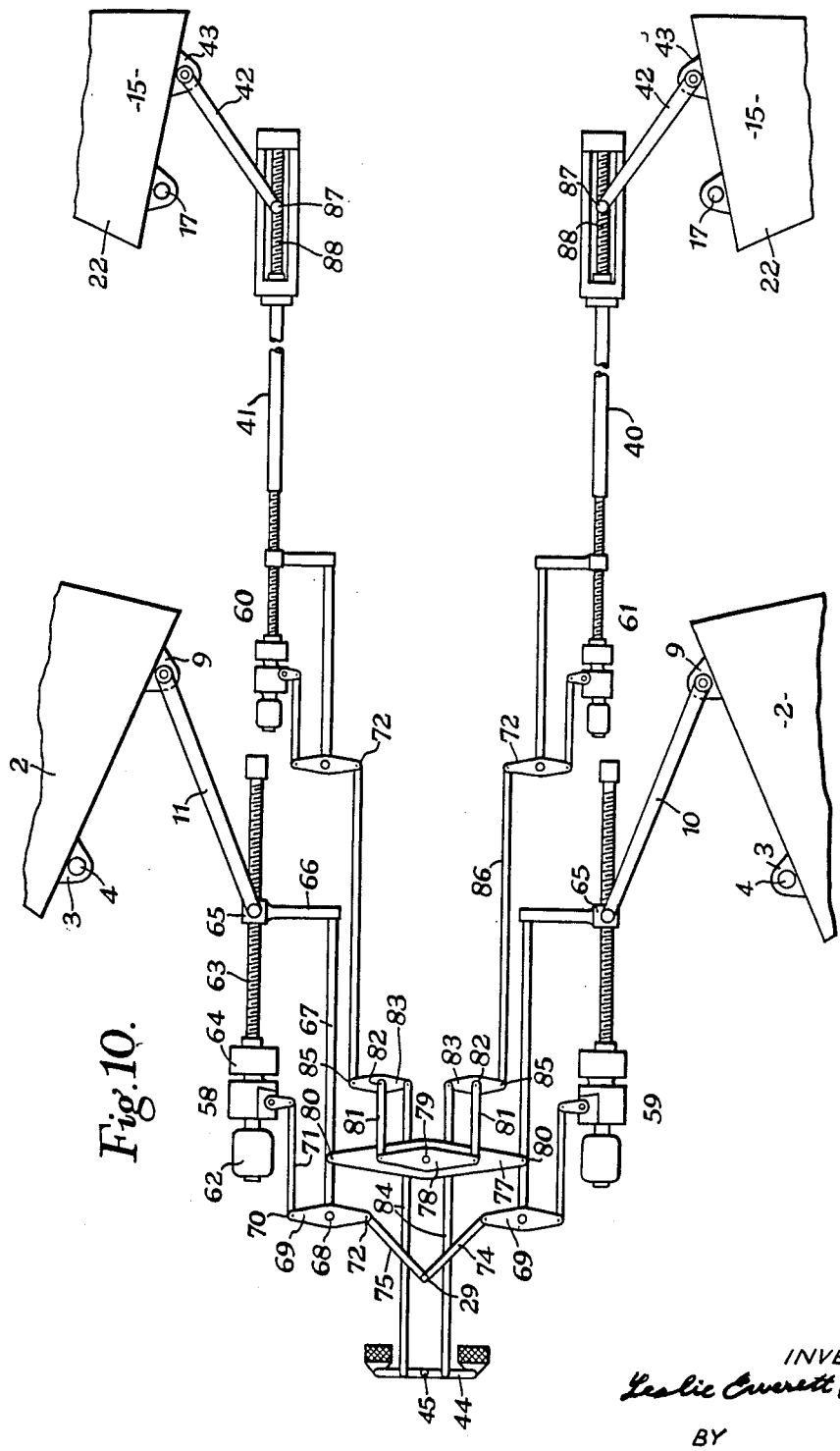

In an alternative form of control mechanism as shown in Fig. 10 the differential gear of Fig. 9 is dispensed with and use is made of a number of jack units. These units of which there are four in the case illustrated in Fig. 10, are like one another and that already described with reference to Fig. 9 in their general constitution, although not necessarily in size. Each unit indicated by a general reference 58, 59, 60 or 61, and which comprises a jack proper with follow-up mechanism, includes an electric motor 62 driving a threaded shaft 63 through a hydraulic (or other) continuously variable speed gear 64, a nut 65 on the shaft 63, a bracket 66 fixed to the nut 65 and connected to one end of a control rod 67 having its other end arranged to support the central pivot 68 of a lever 69. One end 70 of the lever 69 is coupled by a link 71 to the control valve of the hydraulic gear 64. The other end 72 of the lever 69, which is connected to a controlling member will be referred to as the control point of the lever 69.

The control column 29 is connected by two links 74, 75 to the control points of the levers 69 of port and the starboard jack units 58 and 59 for control of the wings 2, to vary the sweepback of the wings as described in the earlier specification, the nuts 65 of the units 58 and 59 being connected to the operating push rods or struts 10 and 11 for the wings 2. Two levers 77 and 78, one of which 77 is about twice the length of the other 78, are pivotally mounted on a common shaft 79. The ends of the longer lever 77 are pivotally coupled respectively to points 80 on the port and starboard wing follow-up gear. Each end of the shorter lever 78 is pivotally coupled to one end of a push rod 81 having at its other end the pivot 82 of a further centrally pivoted lever 83. One end of each of the levers 83 is coupled by a pivoted push rod 84 to the rudder bar 44 centrally pivoted at 45 as before, one push rod 84 being pivoted on the port and the other on the starboard side of the pivot axis 45 of the rudder bar 44. The other ends 85 of the levers 83 are pivoted respectively to port and starboard tail control push rods 86 which are suitably guided and have their other ends pivotally connected to the control points 72 of port and starboard tail control jack units 60 and 61 respectively. The shafts 40 and 41 of these jack units 60 and 61 pass through the fuselage to the tail where each is journalled and has a nut 87 upon a threaded portion 88, the nut 87 being connected to one end of the operating push rod or strut 42 of the corresponding tail surface 15.

Although two forms of control have been described and illustrated in detail, it is to be understood that many variations may be made in such detail and that other control mechanisms may be used.

I claim:

1. An aircraft having a fuselage, two wings, means hinging said wings to the fuselage about axes which are approximately vertical when the aircraft is in level flight and permitting movement of said wings through a substantial angle from a substantially fully spread condition to a condition in which the wings are swept back through said substantial angle, two tail surfaces set at a substantial dihedral angle, means hinging said tail surfaces to the fuselage for movement about axes approximately normal to the tail surfaces and hence inclined upward and inward relatively to one another, and a control mechanism operable while the aircraft is in flight for varying the sweepback of the wings and tail surfaces, said control mechanism comprising a control means and means coupling said control means to said wings and tail surfaces and constituted to vary the sweepback of the tail surfaces in unison for longitudinal control and differentially for control in yaw.

2. An aircraft as claimed in claim 1, wherein said control means comprise two actuators, and said coupling means comprise a first coupling system coupling one of said actuators to said wings and tail surfaces to impart thereto simultaneous movement about their respective axes in the same sense, and a second coupling system coupling the other of said actuators to said two tail surfaces to produce movement of said tail surfaces in opposite senses about their respective axes.

3. An aircraft as claimed in claim 1, wherein said control means comprise two actuators, and said coupling means comprise a first transmission system including two jack units and follow-up mechanisms coupling a first of said actuators with said wings respectively, a second transmission system including two further jack units and follow-up mechanisms coupling the second of said actuators with said tail surfaces respectively, and means coupling said transmission systems to permit the imparting to said tail surfaces of a compounded movement upon simultaneous operation of both said actuators.

4. An aircraft as claimed in claim 1 wherein the dihedral angle of the tail surfaces is in all positions of said control means greater than the dihedral angle of the wings.

5. An aircraft as claimed in claim 1 wherein the hinge axes of the tail surfaces are arranged at a small rearward and upward inclination to the vertical with the aircraft in level flight, and at a small upward and outward inclination to a normal to the plane of the respective tail surfaces.

References Cited in the file of this patent

UNITED STATES PATENTS

| | | |
|---|---|---|
| 1,009,770 | McKenzie | Nov. 28, 1911 |
| 1,018,413 | Dunton | Feb. 27, 1912 |
| 1,506,867 | Schneider | Sept. 2, 1924 |
| 2,162,066 | De Asis | June 13, 1939 |
| 2,424,889 | Holmes | July 29, 1947 |
| 2,454,981 | Vint, Jr. | Nov. 30, 1948 |

FOREIGN PATENTS

| | | |
|---|---|---|
| 464,932 | France | Nov. 14, 1913 |
| 526,162 | Great Britain | Sept. 12, 1940 |